United States Patent [19]

Reutlinger

[11] 4,214,481
[45] Jul. 29, 1980

[54] METHOD AND DEVICE FOR APPLYING A DETECTABLE REFERENCE MARK ON A BODY TO BE BALANCED

[76] Inventor: Wolf-Dieter Reutlinger, Novalisstrasse 5, D-6100 Darmstadt, Fed. Rep. of Germany

[21] Appl. No.: 972,518

[22] Filed: Dec. 22, 1978

[30] Foreign Application Priority Data

Sep. 13, 1978 [DE] Fed. Rep. of Germany ....... 2839819

[51] Int. Cl.$^3$ ............................................. G01M 4/26
[52] U.S. Cl. ......................................... 73/462; 360/1
[58] Field of Search .................. 73/462; 324/173, 174, 324/179

[56] References Cited

U.S. PATENT DOCUMENTS

| 2,558,249 | 6/1951 | Hewlett et al. | 360/51 |
| 3,048,041 | 8/1962 | Trimble | 73/462 |
| 3,838,464 | 9/1974 | Doyle | 360/137 |
| 4,064,704 | 12/1977 | Blackburn | 73/462 |

FOREIGN PATENT DOCUMENTS 1268880 5/1968 Fed. Rep. of Germany ............. 73/462

Primary Examiner—S. Clement Swisher

Attorney, Agent, or Firm—Darbo & Vandenburgh

[57] ABSTRACT

An annular ferromagnetic portion, i.e., "track", of the body to be balanced is rotated adjacent a first electromagnet having a decaying magnetic field which renders that track magnetically homogeneous. Thereafter, a large electrical current of short duration from the discharge of a capacitor is passed through a second, marking electromagnet positioned adjacent that track to produce a high-intensity magnetic pulse. This magnetic pulse produces a very localized spot of permanent magnetization in the track which spot serves as the reference "mark". When the body is then rotated during its balancing operation, that mark will produce an electrical signal each time it passes a magnetic/electric transducer positioned adjacent the rotating track. When the periphery of the body to be balanced consists of a plurality of lands separated by axially aligned slots, the periphery is scanned (while the body is being rotated) and triggering of the discharge current from the capacitor through the marking electromagnet is determined by that scanning to the end that it occurs when one of the lands is immediately adjacent the marking electromagnet.

21 Claims, 10 Drawing Figures

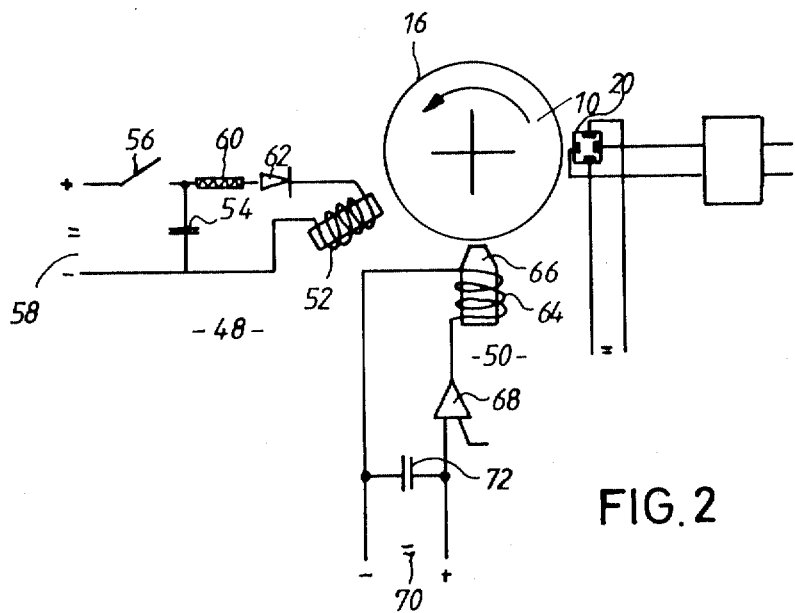
FIG. 2
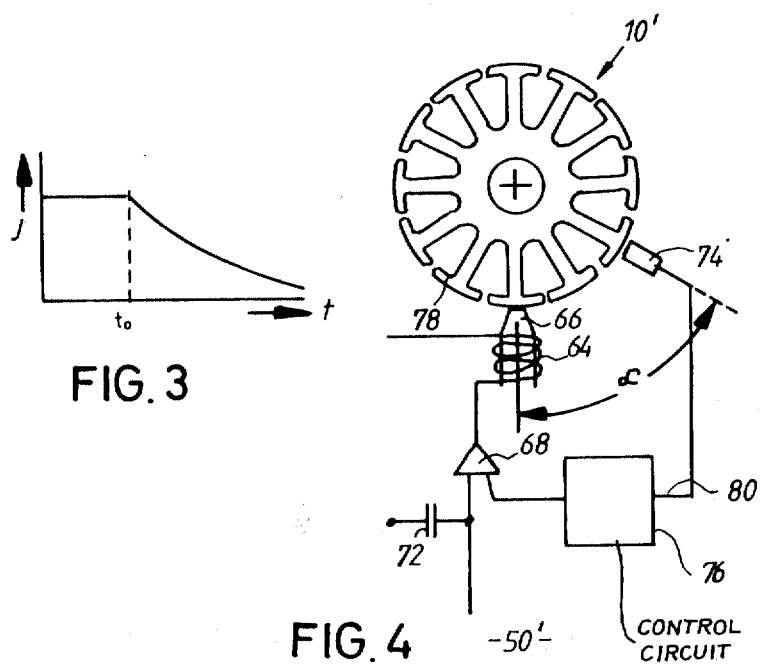
FIG. 3
FIG. 4

METHOD AND DEVICE FOR APPLYING A DETECTABLE REFERENCE MARK ON A BODY TO BE BALANCED

BACKGROUND AND SUMMARY OF THE INVENTION

The invention relates to a method for applying a detectable reference mark on a rotating body to be balanced, said mark being of a character to generate a reference signal used (1) for measuring the unbalance position and (2) for positioning the body during unbalance correction.

In the measurement of an unbalance in accordance with conventionval practices, the body to be balanced is rotated at an unbalance measuring rotary speed. While being so rotated the force or displacement oscillation of the body are measured in its bearings. The phase of the force or displacement oscillations permits determination of the position of the unbalance on the body, and thus of those locations in which mass must be removed or added by an appropriate unbalance correction apparatus. The phase of the force or displacement oscillations is measured in relation to a reference signal. This reference signal corresponds to a certain point of the rotating body in relation to which the angular position of the unbalance on the body to be balanced is determined. The present invention relates to the establishment of a reference mark on the body to produce such a reference signal.

In many cases the body to be balanced rotates freely during the unbalance measuring procedure without being connected to a drive motor. Then a reference signal for determining the unbalance position is generated by applying a reference mark on the body to be balanced and by detecting said mark without contacting the body. The position of the unbalance is then determined by the angular position of the unbalance with respect to the reference mark.

It is known to apply on the body to be balanced a reference mark in the form of a contrast color dot or dash, which may then be detected photoelectrically. Furthermore, photoelectric methods are known with which an axial groove or bore is provided on the rotating body. A light beam passes through this groove in a certain angular position and impinges upon a photoelectric detector. Furthermore, magnetic or inductive methods are known, wherein an element present on the rotating body or provided for this purpose by the design of the body, and interrupting the contour of the body, for example a groove or a key inserted into such groove, is detected. The marks detected photoelectrically, magnetically or inductively provide one short-time pulse per revolution. This pulse is converted into an electric signal of sinusoidal, triangular or rectangular waveform in a signal generator or processing circuit, this signal having a fixed phase relation with respect to the pulse. The reference signal thus obtained, which represents an instantaneous angular position of the rotating body about its rotational axis, is processed in an unbalance signal processing circuit together with the signals derived from the force or displacement oscillations. The unbalance signal processing circuit provides output signals which represent the angular position of the unbalance relative to the reference mark, and the amount of the unbalance.

In manufacturing operations the application of photoelectrically detectable marks presents problems, in particular with balancing in quantity production, in which short balancing times are essential. The reference marks are mostly applied manually as a dot of paint, which is time consuming and usually not too accurate. Higher accuracy can be achieved by affixing adhesive tape of light reflecting material. The application of such adhesive tape, however, requires still more time. Experiments to apply the reference marks mechanically have not yet led to satisfactory results. The photoelectric detection of grooves or bores of the rotating body as well as the magnetic or inductive detection is limited to individual cases, where the design permits such measures.

In order to avoid the problems described in the field of the automatic balancing of electromotors in series, a method is known wherein the contour of the motor rotor interrupted by the slots is scanned. Thus a twelve-fold slotted motor rotor generates twelve pulses per revolution which, for example, are applied to a counter counting from 1 to 12. One of these twelve individual pulses is declared to be the reference pulse, i.e., the reference mark, to which the unbalance measurement is referred. When the body is braked down, the electric counting system remains coupled thereto. During a positioning procedure following the braking down, the body is controlled angularly by the counting system such that the land of the interrupted contour generating the reference pulse comes to a standstill in a certain angular position. An appropriate gripping and conveying device conveys the body from this position into the subsequent correcting station and places it thus positioned into this correcting station. A further rotating procedure in the correcting station takes care of the body being adjusted to the correct correction position opposite the correcting tool, on the basis of the stored measuring data for the unbalance position with respect to the prepositioned reference land.

This method suffers from the disadvantage that its application is limited to bodies having multiple interrupted contours, preferably to slotted bodies. Furthermore, as a rule, it can be used only if measuring and correcting stations and interlinked with each other. It is not possible to remove the body in any optional way from the measuring station, as at this moment its angular reference would be lost. This is disadvantageous in particular with semi-automatic balancing installations. The method is appropriate, with the limitation to bodies having interrupted contours, substantially to fully automatic installations, the economic use of which is restricted to mass production.

The present invention permits automatic application of a detectable reference mark on an annular ferromagnetic portion of a body to be balanced, and without physical contact being made with the body.

The method of the invention is characterized by the following procedural steps: magnetic homogenization of a ferromagnetic rotating track of the body; generating a short-time magnetic pulse of high intensity at a location immediately adjacent the rotating track to produce a locally limited, permanent magnetization serving as said reference mark.

The invention also relates to an apparatus for the carrying out of the method.

DESCRIPTION OF THE DRAWINGS

FIG. 2 schematically shows that part of the machine of FIG. 1 that applies the reference mark;

FIG. 3 shows the waveform of the energizing current for the magnetic homogenization of the rotating track;

FIG. 4 schematically shows a modified embodiment of that part of the machine of FIG. 1 that applies the reference mark;

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Figure 1:
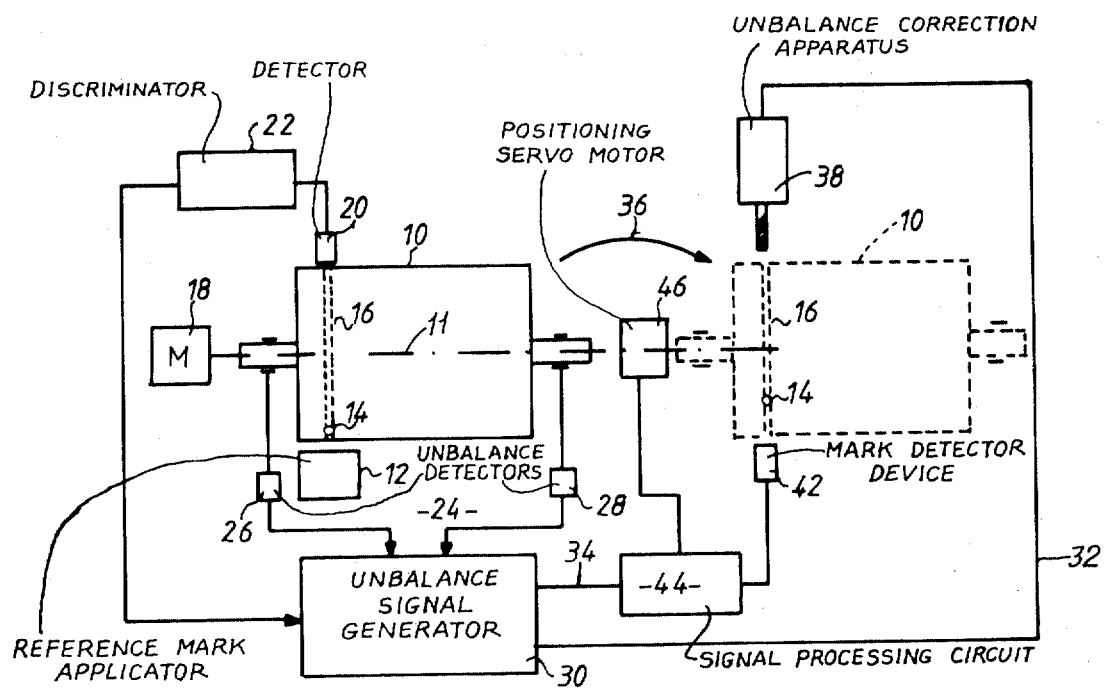
FIG. 1 schematically illustrates a balancing machine according to the present invention.

FIG. 1 shows schematically the basic setup of a balancing machine. A body 10 to be balanced is supported for rotation about its axis 11. When the body is rotated, a part of its periphery will continuously pass an object located adjacent thereto; this portion of the periphery being referred to herein as a rotating track 16 on the surface of the body. Of course, this "track" is not necessarily visible to the eye. A device 12, subsequently to be described, applies a detectable reference mark 14 (a localized spot of permanent magnetization) on this rotating track 16 of body 10.

After the reference mark 14 has been applied, the body 10 is driven rotatively at an unbalance measuring rotary speed by means of a drive means 18 (e.g., a motor). A detector 20, in the form of a magnetic/electric transducer scans the rotary track 16 and detects the reference mark 14 and generates a first detector signal. The first detector signal is supplied to a signal clipper and shaper 22 to produce a reference signal.

An unbalance measuring device 24 comprises unbalance sensors 26, 28 for generating unbalance measuring signals, and and unbalance signal processing circuit 30 (which may be referred to as an "unbalance signal generator"), to which the unbalance measuring signal and the reference signal are applied, for providing output signals at outputs 32 and 34, which represent the unbalance of the body 10 as to amount and position, respectively (the "position" being angular position with respect to reference mark 14). These output signals may be stored in conventional manner for subsequent unbalance correction.

An unbalance correcting station, into which the body 10 may be placed as indicated by the arrow 36, after the unbalance measuring procedure has been completed, comprises unbalance correction apparatus 38 as well as a positioning means for positioning the body 10 relative to the unbalance correction apparatus 38, such that the unbalances to be corrected are in the correct position for the correction relative to the unbalance correction apparatus 38. The positioning means, to which the output signals representing the position of the unbalance may be supplied from the output 34 of the unbalance measuring device 24, comprise a detector device 42 for detecting the reference mark 14 and for generating a second detector signal, a signal processing circuit 44 and a servomotor 46 for positioning the body 10.

FIG. 2 shows the device 12 for applying reference mark 14 to the body 10. It comprises a device 48 for first producing magnetic homogenization (which may be by demagnetization to a significant degree) of the ferromagnetic rotating track 16 followed by a device 50 for applying the "mark" 14 thereto. The magnetic homogenization device includes an electromagnet 52 arranged adjacent the ferromagnetic rotating track 16. A storage capacitor 54 is connected in parallel to the electromagnet 52. Electromagnet 52 and storage capacitor 54 are connected to a direct current source 58 through a switch 56. An ohmic resistor 60 and a diode 62 are connected between storage capacitor 54 and the electromagnet.

The device 50 for generating a substantially instantaneous magnetic pulse and thus applying the mark 14 in the track 16 comprises an electromagnet 64 having a pole piece 66 with a truncated conical nose tapering towards the body 10. The axis of the truncated conical nose is positioned in an approximate radial alignment to the body 10. The electromagnet 64 is connected through a controlled switch 68, for example a thyristor, across a storage capacitor 72 supplied by a direct current source 70.

The initial magnetic homogenization of the rotating track 16 is effected with the body 10 at a rotary speed below the unbalance measuring rotary speed. To this end, with the body 10 so rotating, switch 56 is closed. An energizing current flows in the electromagnet 52 as shown in FIG. 3. Capacitor 54 is simultaneously charged. At the moment $t_o$, switch 56 is opened. Without particular precautions, the opening of this switch 56 could result in peak currents which cause local magnetization of the ferromagnetic rotating track 16 and thus could generate a false reference mark. For this reason the magnetic homogenization is effected by a magnetic field decaying continuously with time, as shown in FIG. 3. To this end the storage capacitor 54, connected in parallel to the electromagnet 54 and charged by the direct current source 58 during the time switch 56 was closed, is discharged through the electromagnet with an energizing current decaying in accordance with FIG. 3 after the switch 56 has been opened. The decay time should be sufficiently long, in relation to the speed of rotation of the body, that a substantial magnetic homogenization of the ferromagnetic material of all of track 16 is achieved. The ohmic resistor 60 and the diode 62 counteract the build-up of oscillations of the oscillatory circuit formed by the electromagnet 52 and capacitor 54.

For the generation of the substantially instantaneous magnetic pulse to produce the mark 14, the storage capacitor 72 is discharged through the electromagnet, when the thyristor 68 is fired, i.e., the controlled switch represented thereby is closed. The current from the capacitor 72 is many times greater than that which will pass through the electromagnet 64 from the source 70 alone. This results in a pulse-like, very high discharge current through the magnet 64 and a correspondingly high-intensity magnetic pulse, which produces a locally limited, permanent magnetization on the rotating track 16 of the body 10, said magnetization serving as the reference mark 14.

Subsequently the body 10 is driven rotatively to the unbalance measuring rotary speed by the drive means 18, the unbalance measurement being made in conventional manner at this speed. The reference mark 14 is detected by means of detector 20 which is a Hall generator. The first detector signal thus obtained is processed (amplified and shaped) in the signal processing circuit 22 and provides a reference signal.

With a body having interrupted (for example slotted) contour, as illustrated in FIG. 4, with the rotating track 16 being located on the interrupted contour, care must be taken to ensure that the magnetization serving as reference mark 14 is always applied on a land located between two slots. Therefore with such a body the generation of the short-time magnetic pulse comprises the steps of: scanning the contour for generating contour scanning signals; and controlling the instant of the triggering of the magnetic pulse from electromagnet 64, 66 as a function of the contour scanning signals, such that the magnetization serving as reference mark is applied on a land located between two slots.

To this end the device 50' for applying a detectable reference mark 14 on the slotted body 10' of FIG. 4 comprises a sensor 74 for scanning the contour and for generating contour scanning signals. This sensor may be a conventional approximation switch or a capacitative sensor. The contour scanning signals are supplied to a control circuit 76, which provides a control pulse for the controlled switch 68, such that the controlled switch 68 closes at such an instant that the magnetic pulse of electromagnet 64, 66 to produce the reference mark 14, caused by discharging of the storage capacitor 72 through the electromagnet, will occur when the electromagnet 64, 66 is opposite a land 78 located between two slots as illustrated in FIG. 4.

Figure 6:
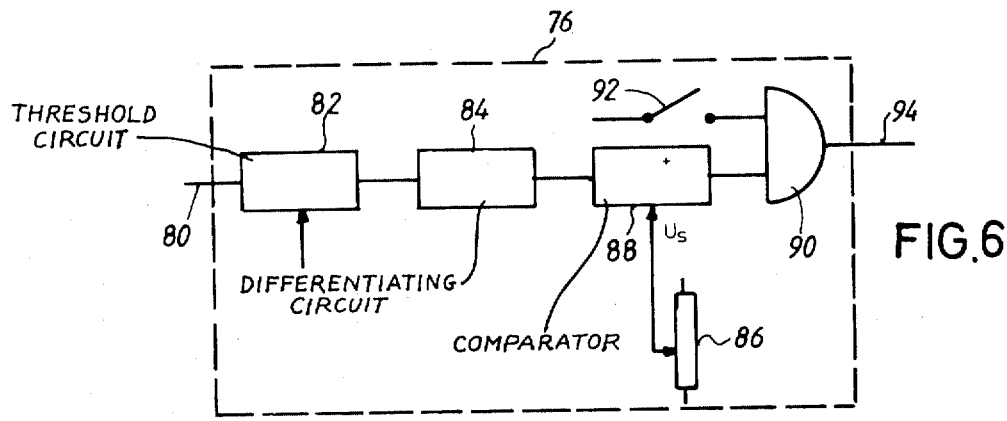
FIG. 6 is a block diagram showing the control circuit for processing the contour scanning signal of FIG. 5.
Figure 7:
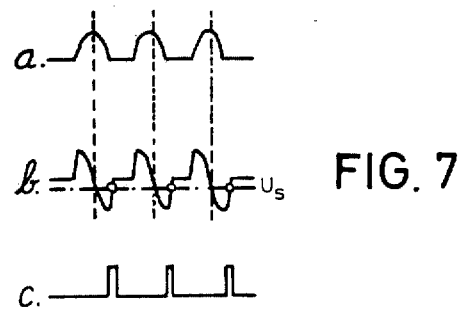
FIG. 7 shows the waveforms in the control circuit of FIG. 6.

FIG. 6 illustrates an embodiment for the control circuit 75 of FIG. 4. The signals occurring therein are illustrated in FIGS. 5 and 7.

Figure 5:
FIG. 5 shows the waveform of the contour scanning signal obtained by the presence of the lands of the rotating slotted body of FIG. 4.

FIG. 5 illustrates the contour scanning signals from sensor 74 during a complete revolution with a body having twelve lands. These signals are applied to an input 80 of circuit 76. They are supplied to a threshold circuit 82 which passes only the signal components exceeding a predetermined threshold value, as illustrated in FIG. 7a. A differentiating circuit 84 is connected to the output of the threshold circuit, the passed signal components (FIG. 7a) being supplied to said differentiating circuit. The differentiating circuit produces a differentiated signal in accordance with the time derivative of these signal components, the differentiated signal being illustrated in FIG. 7b. A variable reference voltage $U_S$ is obtained from a voltage divider 86. This reference voltage and the differentiated signal are supplied to a comparator which generates output pulses (FIG. 7c) at the moments when the positive slope of the differentiated signal passes through the reference voltage $U_S$, as shown in FIG. 7b. The pulses from comparator 88 (FIG. 7c) are applied to one input of an AND-gate 90. A command signal to generate the control pulse for triggering the magnetic pulse, indicated by a switch 92, is applied to the other input of the AND-gate. When switch 92 has been closed, the next output pulse of the control circuit 88 will pass through the AND-gate 90 and will generate, at output 94, the firing pulse for the thyristor 68 (FIG. 4) acting as the controlled switch. Further output pulses will no longer affect the thyristor. By changing the setting of voltage divider 86 and thus varying the reference voltage, the position of the comparator output pulses (FIG. 7c) may be varied, which enables the operator to ensure that the magnetic pulses will occur exactly when the axis of electromagnet 64 is opposite the center of the land 78.

Figure 9A:
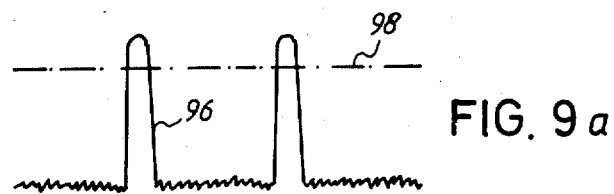
FIGS. 9a and 9b show waveforms which illustrate the mode of operation of the circuit of FIG. 8.

In spite of the previously described magnetic homogenization of the rotating track 16, certain magnetic inhomogeneities may still remain and result in disturbances. For this reason the generation of the reference signal comprises the following additional procedural steps: selecting a threshold, which is so high that the residual disturbance (FIG. 9a), remaining in the rotating track 16 after the magnetic homogenization, is below the threshold but the peak of the signal 96, which signal is generated by the magnetization caused by the magnetic pulse, is above the threshold 98 and generating the reference signal by processing only the peaks of the detector signals above the threshold. In addition, only one polarity of the detector signals is used for signal processing.

Figure 8:
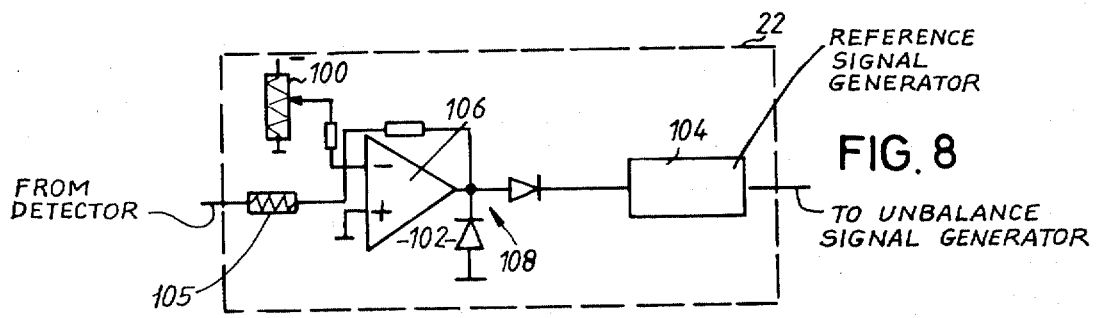
FIG. 8 illustrates the clipper and shaper processing of the signals from reference mark detector of FIG. 1.
Figure 9B:
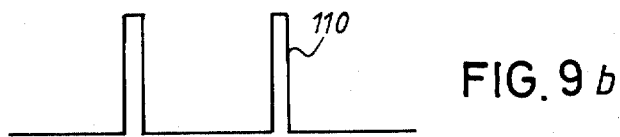

FIG. 8 illustrates an embodiment of the signal clipper and shaper 22 of FIG. 1. It comprises an adjustable threshold generator 100 for setting a threshold voltage and means 102 for suppressing the signal components not exceeding the threshold, as well as a circuit 104 for generating the reference signal from only the signal components which exceed the threshold. The means 102 for suppressing signal components below the threshold comprises a summing amplifier 106. The signal from the threshold generator 100 is applied to one input (−) of the summing amplifier along with (through resistor 105) the signal from the detector 20, but the two signals being opposite in polarity. A diode arrangement 108 ensures that only pulses of one polarity pass to the reference signal generator. The form of the signals to the reference signal generator are shown in FIG. 9b as pulses 110. In a known manner the reference signal generator is triggered thereby to produce the appropriate electric signals of sinusoidal, triangular or rectangular waveform. By adjusting the threshold voltage from threshold generator 100 the threshold 98 of clipping of the detector signals is appropriately varied.

Preferably the detector 42 is also a Hall generator. In the correction station right hand side of FIG. 1) the body 10 initially is rotated to the point at which the sensor 42 responds. Starting from the reference position thus obtained, the body 10 then again is rotated further through the angle resulting from output signal 34.

The invention also is applicable with balancing machines with which balancing is effected in components. In this case the reference mark permits rotation of the body 10 into an exactly defined position relative to the unbalance correction means.

I claim:

1. A method for balancing a body having an axis and a peripheral ferromagnetic portion thereabout and comprising the steps of:
   (a) applying a detectable reference mark on the body,
   (b) rotating the body about the axis at an unbalance measuring rotary speed,
   (c) while the body is so rotating detecting the reference mark and generating therefrom a reference signal for measuring the unbalance position,
   (d) while the body is so rotating measuring the unbalance of the body as to amount and unbalance position making use of the reference signal,
   (e) thereafter detecting the reference mark and positioning the body relative to unbalance correcting apparatus in accordance with this detecting and with the unbalance position measured relative to the reference mark, and (f) while the body is so positioned correcting the measured unbalance, characterized in that the application of the reference mark comprises the steps of:

magnetic homogenizing said peripheral portion to define a rotating track of the body of substantially magnetic homogeneity; and thereafter generating a substantially instantaneous magnetic pulse of high intensity at a location immediately adjacent the rotating track for generating a locally limited permanent magnetization serving as said reference mark.

2. A method as set forth in claims 1 or 2, characterized in that the magnetic homogenization is effected by applying to said peripheral portion a magnetic field decaying continuously with time.

3. A method as set forth in claim 2 characterized in that the magnetic homogenizing of the peripheral portion is effected while the body is being rotated at a rotary speed below the unbalance measuring rotary speed.

4. A method as set forth in claim 3, characterized in that the generation of the magnetic pulse is effected, while the body is being rotated, if at all, at a rotary speed below the unbalance measuring rotary speed.

5. A method as set forth in claim 2, characterized in that the step of detecting the reference mark and generating the reference signal comprises the steps of:

producing a detector signal when the reference mark is detected;

clipping said detector signal at a threshold below the tops of the peaks caused by the locally limited permanent magnetization and above the part of the detector signal caused by any residual magnetic disturbance remaining in the rotating track after the magnetic homogenization; and generating the reference signal by using only the top of a peak remaining after the detector signal is so clipped.

6. A method as set forth in claim 5, characterized in that only one polarity of the detector signals is so used for generating the reference signal.

7. A method as set forth in claim 2 for balancing bodies wherein the peripheral ferromagnetic portion comprises a plurality of lands, which lands are separated by slots generally parallel to said axis, characterized in that the generation of the short-time magnetic pulse comprises the steps of:

scanning said peripheral portion and generating contour scanning signals representing the instantaneous angular position of said lands; and controlling the generation of the substantially instantaneous magnetic pulse as a function of the contour scanning signals, such that the locally limited permanent magnetization serving as reference mark is applied on a land.

8. An apparatus comprising the combination of a device for applying a detectable reference mark on a body to be balanced and having an axis and a peripheral ferromagnetic portion thereabout, said mark being adapted to generate a reference signal employed for determining the unbalance position and employed for positioning the body during unbalance correction operation, and additional elements for detecting the magnitude and angular position of the unbalance of said body and for correcting said unbalance, said device comprising:

means adjacent said body for substantially magnetically homogenizing said peripheral portion to define a rotating track of the body of substantially magnetic homogeneity; and means for generating a substantially instantaneous magnetic pulse of high intensity at a location immediately adjacent the magnetically homogenized rotating track for generating a locally limited permanent magnetization serving as said reference mark; and said elements comprising:

drive means for rotating the body about the axis at an unbalance measuring rotary speed;

detector means adjacent the rotating body for detecting the reference mark and for producing a first detector signal;

signal processing means connected to said detector means for generating a reference signal from said detector signal;

unbalance measuring means coupled to the rotating body and including unbalance sensors for generating unbalance measuring signals and an unbalance signal processing circuit, to which the unbalance measuring signals and the reference signal are supplied, for generating output signals which represent the unbalance of the body as to amount and position; and unbalance correction means and a positioning device for positioning the body relative to the unbalance correction means such that the unbalances to be corrected are in the correct position for correction relative to the unbalance correction means, the positioning means, to which the output signals representing the position of the unbalance are applied from the unbalance measuring device, comprising a detector device for detecting the reference mark and for generating a second detector signal, and positioning the body in accordance with this second detector signal and the position of the unbalance measured relative to the reference mark.

9. An apparatus as set forth in claim 8, wherein said means for magnetically homogenizing said body portion comprises an electromagnet positioned adjacent said body portion and means connected to said electromagnet to control the energization thereof in a manner such that the electromagnet has a magnetic field decaying continuously with time.

10. An apparatus as set forth in claim 9 and for use with a direct current power source, and characterized by:

said means connected to the electromagnet comprising a storage capacitor and circuit means connecting the capacitor and electromagnet in parallel and both to said power source and including a switch by which both can be disconnected from said power source.

11. An apparatus as set forth in claim 10, wherein said circuit means includes a resistor connected between the capacitor and the electromagnet.

12. An apparatus as set forth in claims 10 or 11 wherein said circuit means includes a diode connected between the capacitor and the electromagnet.

13. An apparatus as set forth in claim 10 and for use with a direct current power source, said apparatus being characterized by:

said means for generating the substantially instantaneous magnetic pulse comprising an electromagnet positioned adjacent said body portion, and means connected to said electromagnet and to said power source for supplying said electromagnet with a short, high current pulse of direct current electrical energy.

14. An apparatus as set forth in claim 13, wherein said means for supplying said current pulse comprises a storage capacitor and circuit means connecting said storage capacitor to said power source and connecting said storage capacitor to said electromagnet through a switch means.

15. An apparatus as set forth in claim 14 and used wherein the peripheral ferromagnetic portion of the body comprises a plurality of lands, which lands are separated by slots generally parallel to said axis, said apparatus being characterized by the means for generating the substantially instantaneous magnet pulse comprising:
 sensor means positioned adjacent said portion as said body rotates for generating electrical signals which vary as the lands and slots respectively pass said sensor means; and
 control means connecting said sensor means and said switch means for closing said switch means to discharge said capacitor through said electromagnet to produce said magnetic pulse at a time at which the part of the body most closely adjacent said electromagnet is a land.

16. An apparatus as set forth in claim 15, wherein said control means comprises:
 threshold circuit means connected to said sensor means for receiving said electrical signals and for passing only the signal components exceeding a predetermined threshold value;
 differentiating means connected to said threshold circuit means to receive the passed signal components and for providing a differentiated signal in accordance with the time derivative of the signal components;
 means for generating a variable reference voltage;
 comparator means connected to the differentiating means and to the reference voltage means for comparing the differentiated signal to the reference voltage and for generating output pulses at the moments, when the positive slope of the differentiated signal passes through the reference voltage; and
 means connected to said comparator means and to said switch means for synchronizing the closing of the switch means with one of these output pulses.

17. An apparatus as set forth in claim 13, wherein said electromagnet includes a ferromagnetic core, having a truncated conical nose formed about an axis, said core being positioned with said nose adjacent said body and with the axis thereof substantially radially aligned with respect to the body.

18. An apparatus as set forth in claim 8, wherein said signal processing means comprises:
 an adjustable threshold generator for producing a threshold voltage signal;
 means connected to said threshold generator and to said detector means for passing only the parts of the first detector signal that are above the threshold and for suppressing the remainder of the first detector signal; and
 circuit means connected to the last mentioned means for generating said reference signal in response to the passed parts of the first detector signal.

19. An apparatus as set forth in claim 8, wherein said detector means for generating the first detector signal is a Hall generator.

20. An apparatus comprising the combination of a device for applying a detectable reference mark on a body to be balanced and having an axis and a peripheral ferromagnetic portion thereabout, said mark being adapted to generate a reference signal employed for determining the unbalance position and employed for positioning the body during unbalance correction operation, and additional elements for detecting the magnitude and angular position of the unbalance of said body and for correcting said unbalance,
said device comprising:
 drive means for rotating said body about said axis at a first speed;
 means adjacent said body for substantially magnetically homogenizing said peripheral portion to define a rotating track of the body of substantially magnetic homogeneity; and
 means for generating a substantially instantaneous magnetic pulse of high intensity at a location immediately adjacent the magnetically homogenized rotating track for generating
 a locally limited permanent magnetization serving as said reference mark; and
said elements comprising:
 drive means for rotating the body about the axis at an unbalance measuring rotary speed which is greater than said first speed;
 detector means adjacent the rotating body for detecting the reference mark and for producing a first detector signal;
 unbalance measuring means coupled to the rotating body and including unbalance sensors for generating unbalance measuring signals;
 unbalance correcting means; and
 means connecting said detector means, said unbalance measuring means and said unbalance correcting means for receiving said detector signal and said unbalance measuring signals and for providing signal to the unbalance correcting means representing the unbalance to be corrected and the location of that unbalance relative to said reference mark.

21. An apparatus as set forth in claim 20, wherein the last mentioned means includes memory means for storing the signals to be provided to the unbalance correcting means which stored signals represent the amount and location of the unbalance; and
wherein said unbalance correcting means comprises:
 machining means positioned at a location adjacent said body for locally removing material of the unbalanced body;
 servo motor means engaging the unbalanced body and positioning the body relative to the location of the machining means;
 sensor means positioned adjacent the unbalanced body, in registry with said track and at a fixed location with respect to said servo motor means for detecting said reference mark and providing a reference pulse; and
 control means connected to said memory means, to said sensor means and to said servo motor means to receive said stored location signals and said reference pulse and to control the servo motor means to position the body such that the unbalance to be corrected is at the location of the machining means.

* * * * *

UNITED STATES PATENT AND TRADEMARK OFFICE
CERTIFICATE OF CORRECTION

PATENT NO. : 4,214,481

DATED : July 29, 1980

INVENTOR(S) : Wolf-Dieter Reutlinger

It is certified that error appears in the above-identified patent and that said Letters Patent are hereby corrected as shown below:

```
Col. 1, l. 15    "conventionval" should be --conventional--
Col. 2, l. 43    "and" should be --are--
Col. 3, l. 49    "and" second occurrence, should be --an--
Col. 5, l. 37    "75" should be --76--
Col. 6, l. 43    insert a parenthesis "(" before "right"
Col. 7, l. 15    "claims" should be --claim-- and delete "or 2"
Col. 7, l. 19    "claim 2" should be --claim 1--
Col. 7, l. 28    "claim 2" should be --claim 1--
Col. 7, l. 45    "claim 2" should be --claim 1--
Col. 8, l. 64    "claim 10" should be --claim 8--
Col.10, l. 41    "signal" should be --signals--
```

Signed and Sealed this

Eleventh Day of November 1980

[SEAL]

Attest:

SIDNEY A. DIAMOND

Attesting Officer

Commissioner of Patents and Trademarks